United States Patent [19]

Onan et al.

[11] Patent Number: 5,159,980
[45] Date of Patent: Nov. 3, 1992

[54] WELL COMPLETION AND REMEDIAL METHODS UTILIZING RUBBER LATEX COMPOSITIONS

[75] Inventors: David D. Onan, Lawton; Garland W. Davis, Comanche; Roger S. Cromwell, Walters, all of Okla.

[73] Assignee: Halliburton Company, Duncan, Okla.

[21] Appl. No.: 722,045

[22] Filed: Jun. 27, 1991

[51] Int. Cl.$^5$ .............................................. E21B 33/14
[52] U.S. Cl. ..................................... 166/294; 523/130
[58] Field of Search ................... 166/288, 294, 295; 523/130-132; 405/265, 264

[56] References Cited

U.S. PATENT DOCUMENTS

| | | | |
|---|---|---|---|
| 2,502,191 | 3/1950 | Williams | 166/293 X |
| 3,228,907 | 1/1966 | Eash | 524/3 |
| 3,952,805 | 4/1976 | Persinski et al. | 166/293 |
| 4,036,660 | 7/1977 | Persinski et al. | 166/293 X |
| 4,151,150 | 4/1979 | Peters et al. | 524/8 |
| 4,301,016 | 11/1981 | Carriere et al. | 523/130 X |
| 4,537,918 | 8/1985 | Parcevaux et al. | 523/130 |
| 4,649,998 | 3/1987 | Friedman | 166/294 |
| 4,721,160 | 1/1988 | Parcevaux et al. | 166/293 |
| 4,767,460 | 8/1988 | Parcevaux et al. | 523/130 |

OTHER PUBLICATIONS

Paper No. SPE 20453, "Cement Sheath Stress Failure" by K. J. Goodwin et al. (Presented in New Orleans, Louisiana, Sep. 23-26, 1990).

*Primary Examiner*—Stephen J. Novosad
*Attorney, Agent, or Firm*—Thomas R. Weaver

[57] ABSTRACT

Well completion methods utilizing rubber latex compositions are provided. The compositions are comprised of an aqueous suspension of rubber, a vulcanizing agent and a vulcanization activator, and are placed in a subterranean formation or a well bore at a desired location therein and allowed to vulcanize whereby a solid rubber plug or seal is formed.

15 Claims, No Drawings

WELL COMPLETION AND REMEDIAL METHODS UTILIZING RUBBER LATEX COMPOSITIONS

BACKGROUND OF THE INVENTION

1. Field of the Invention

The present invention relates generally to oil and gas well completion and remedial methods, and more particularly, to well completion and remedial methods utilizing rubber latex compositions.

2. Description of the Prior Art

A variety of oil and gas well completion and remedial methods have heretofore involved the use of hydraylic cement compositions. Such cement compositions are usually comprised of a water slurry of Portland cement and various additives such as set time accelerators, retarders, fluid loss reducers, dispersants, etc. The cement slurries are pumped into completion or remedial locations within well bores and/or subterranean formations penetrated thereby and allowed to set into hard impermeable masses.

A principal well completion technique which utilizes a cement composition is known as primary well cementing. Primary well cementing involves the placement of a cement composition in the annulus between the walls of the well bore and a conduit, e.g., casing, disposed therein, and allowing the cement composition to set therein whereby the exterior surfaces of the conduit are bonded to the walls of the well bore. The bonding of the conduit within the well bore serves to maintain the conduit in place and to prevent formation fluids from communicating between subterranean formations or zones or to the surface by way of the annulus.

While primary cementing operations utilizing Portland cement compositions have generally been very successful, when such primary cementing is carried out in wells wherein high temperature differentials and/or high pressures are exerted on the casing or liners cemented therein, failure of the cement seal can occur whereby pressurized fluids from subterranean formations or zones are allowed to flow therebetween or to the surface by way of the annulus. The failure of the primary cement in a well bore can bring about lost revenues as a result of lost production, and because of escaping hydrocarbons, a highly dangerous well condition.

The failure of the primary cement sheath in a well bore is generally due to the exposure of the metal conduit bounded by the cement in the well bore to high temperature as a result of hot fluids being produced from the well and/or the exposure of the metal conduit to high internal test pressures or treatment fluid pressures. Such high temperature and pressure differentials cause the conduit to expand both diametrically and circumferentially which causes failure of the bond at the cement-casing interface and/or causes the cement sheath to fracture radially from the inner casing surface to the outer well bore wall.

In other well completion or remedial operations which utilize Portland cement compositions, e.g., secondary squeeze cementing and other similar operations whereby cracks, voids and other areas are filled with cement and sealed and/or whereby temporary or permanent cement plugs are formed in the well, less than optimum results are often achieved as a result of the set cement lacking resilience, high tensile strength or acid and other chemical resistance. Thus, there is a need for an improved pumpable composition which will set into a hard impermeable mass for use in well completion and remedial methods which provides improved elasticity, resilience, tensile strength, chemical resistance and low permeability.

SUMMARY OF THE INVENTION

By the present invention, improved well completion and remedial methods are provided which meet the needs recited above. The methods consist of forming a temporary or permanent plug or seal in a well bore or in one or more subterranean formations penetrated by the well bore by placing a vulcanizable rubber latex composition at a desired location in the subterranean formations or in the well bore, or both, and causing the rubber latex composition to vulcanize and thereby form a solid rubber plug or seal therein.

A variety of vulcanizable rubber latex compositions can be utilized in accordance with the present invention. Generally, such compositions are comprised of an aqueous suspension of rubber, a vulcanizing agent and a vulcanization activator. The particular rubber and other components utilized in the compositions are selected to provide the required time for placement of the compositions prior to vulcanization and the formation of solid rubber plugs or seals having the desired properties, e.g., elasticity, resilience, chemical resistance and low permeability.

Thus, it is a general object of the present invention to provide improved well completion and remedial methods which utilize rubber latex compositions.

Another object of the present invention is the provision of a method for the primary bonding a conduit such as casing within a well bore whereby a permanent bond and seal between the casing and the walls of the well bore is maintained even though the conduit is subsequently subjected to high temperature and/or pressure differentials.

A further object of the present invention is the provision of improved primary bonding, secondary squeeze operations and other similar well operations utilizing rubber latex compositions whereby seals and plugs having high strength, elasticity, resilience, chemical resistance and low permeability are produced.

Other and further objects, features and advantages of the present invention will be readily apparent to those skilled in the art upon a reading of the description of preferred embodiments which follows.

DESCRIPTION OF THE PREFERRED EMBODIMENTS

The present invention provides an improved method of completing or performing remedial operations in one or more subterranean formations or in the well bore penetrating such formations whereby a temporary or permanent plug or seal is placed therein. The plug or seal formed is comprised of a solid rubber composition having generally superior properties to an equivalent plug or seal formed of a Portland cement composition, i.e., the rubber plug or seal of the present invention has elasticity, resilience, tensile strength which can range from 500 psi to greater than 3000 psi, high resistance to acid or other chemical corrosiveness and low permeability.

The term "rubber" is used herein to mean hydrocarbon polymers occurring naturally, e.g., natural rubber from trees, and any of the synthetic hydrocarbon polymers having properties of elongation or yield under stress and elastic recovery after vulcanization with sulfur or other crosslinking agent. The terms "well completion methods" or "well completion operations" are used herein to mean any of the operations utilized for completing the preparation of a well for hydrocarbon production after it has been drilled including the primary bonding of casing and liners in the well bore, placing light weight flotation barriers over caverned liquid hydrocarbons, consolidating gravel packs or incompetent sands in formations and the like. The terms "remedial methods" or "remedial operations" are used herein to mean procedures carried out in subterranean formations or in well bores penetrating the formations to correct problems such as sealing leaks, cracks or voids, placing plugs in the well bore or in zones or formations containing undesirable fluids, placing temporary plugs in lieu of packers to isolate zones or formations, filling external casing packers and the like.

The methods of the present invention are particularly suitable for providing primary bonding between casing and/or liners disposed in well bores and the walls of the well bores, particularly where the casing or liners are subsequently subjected to high temperature and pressure differentials. Such primary bonding has heretofore been carried out by pumping a cement slurry downwardly through the casing or liner and then upwardly into the annulus between the external surfaces of the casing or liner and the walls of the well bore. After placement of the cement in the annulus, it is allowed to set into a hard impermeable mass. The cement provides a bond between the casing or liner and the walls of the well bore to thereby maintain the casing or liner in place and prevent communication between zones or formations which are penetrated by the well bore via the annulus.

While the heretofore primary cementing methods utilized have been successful, in some wells and particularly where excessive flowing or steam injection temperatures exist at the surface or where high fluid pressures are exerted within the conduit, failures in the cement in the form of cracks or fractures have often been experienced. Such failures allow fluids to flow through the annulus from one formation to another or to the surface causing loss of production and dangerous conditions to exist. The problem is particularly severe in hot deep wells or geothermal wells where the produced fluids flow through the well bore at a high temperature and where high fluid pressures are exerted on the cemented conduit during stimulation and test procedures. The high temperatures and internal pressures causes the conduit to expand which creates a shearing force at the cement-casing interface causing failure of the seal between the cement and the conduit and/or fracturing of the cement radially from the conduit surface to the well bore walls.

The method of the present invention eliminates the above described problems by sealing the annulus between the well bore and a conduit disposed therein with a vulcanized rubber latex composition. That is, in accordance with the method of the present invention for sealing a conduit in a well bore, a vulcanizable rubber latex composition is pumped downwardly through the conduit and upwardly into the annulus between the conduit and the well bore. The rubber latex composition is allowed to vulcanize within the annulus and thereby form a solid rubber seal therein. The solid rubber seal has high strength, high corrosion resistance and effectively bonds the external surfaces of the conduit to the walls of the well bore whereby fluid migration in the annulus is prevented. Because the solid rubber seal has elasticity and resilience, the expansion of the conduit due to high temperatures and pressures exerted thereon does not cause the failure of the solid rubber composition or its sealing and bonding properties.

The methods of the present invention are particularly suitable for performing a variety of well completion and remedial operations in subterranean formations and the well bores penetrating such formations. For example, the methods of the present invention are particularly suitable for performing squeeze remedial operations where a sealant is forced into cracks and/or voids to provide a seal therein. Other operations in which the methods are particularly suitable include, but are not limited to, the consolidation of gravel packs or incompetent formations exposed to high temperatures and pressures, forming temporary or permanent plugs or packers in well bores including horizontal well bores, forming lightweight flotation barriers above liquid hydrocarbons in caverns and the like.

The methods of the present invention for forming temporary or permanent plugs or seals in a well bore or in one or more subterranean formations penetrated by the well bore generally comprise the steps of placing a vulcanizable rubber latex composition in the subterranean formations or in the well bore penetrating the formations at a desired location therein, and allowing the rubber composition to vulcanize and thereby form a solid rubber plug or seal.

The vulcanizable rubber latex composition is generally comprised of a pumpable aqueous dispersion or emulsion of rubber, a vulcanizing agent and a vulcanization activator. Other additives can be included in the composition to adjust and control the viscosity of the composition, to change the time in which vulcanization takes place and/or to change other properties of the rubber latex composition or the properties of the vulcanized rubber seal or plug formed whereby such properties are best suited for the particular application and environment to which the plug or seal is subjected. The term "pumpable" is used herein to mean that the composition has a viscosity and other properties whereby it can be pumped to the location of placement.

As indicated above, a variety of well known rubber materials can be utilized for forming compositions useful in accordance with the present invention. For example, natural rubber (cis-1,4-polyisoprene) in most of its modified types can be utilized. Synthetic polymers of various types can also be used including styrene-butadiene rubber (SBR), cis-1,4-polybutadiene rubber and blends thereof with natural rubber or styrene-butadiene rubber, high styrene resin, butyl rubber, ethylene-propylene rubbers (EPM and EPDM), neoprene rubber, nitrile rubber, cis-/tr-1,4-polyisoprene rubber, silicone rubber, chlorosulfonated polyethylene rubber, crosslinked polyethylene rubber, epichlorohydrin rubber, fluorocarbon rubber, fluorosilicone rubber, polyurethane rubber, polyacrylic rubber and polysulfide rubber. The rubber materials are commercially available in latex form, i.e., aqueous dispersions or emulsions which are utilized directly and to which the other components of the vulcanizable rubber latex compositions are added.

The particular rubber latex utilized for a particular application is selected to provide the particular properties required for that application. For example, natural rubber is superior to styrene-butadiene rubber with respect to low heat build-up, resilience, tensile strength without reinforcement and hot tear strength. Styrene-butadiene rubber, on the other hand, is more resistant to abrasion and weathering.

Carbon black filled vulcanizates of cis-1, 4-polybutadiene rubber exhibit low heat generation, high resilience and high abrasion resistance. Blends of cis-1,4-polybutadiene rubber and natural rubber or styrene-butadiene rubber provide improvements in selected properties. Butyl rubber, particularly with carbon black or other fillers exhibits high impermeability to gases. Ethylene-propylene rubber is free of double bonds and therefore exhibits outstanding resistance to heat, oxygen and other degrading agents. Neoprene rubber has good resistance to heat, oil, and flame, has good resilience and has good gas impermeability. Nitrile rubber can be blended with natural rubber, polysulfide rubbers and various resins to obtain increased tensile strength. Silicone rubber generally has less desirable physical properties, but such properties can be improved by the incorporation of inorganic extenders such as titanium oxide, zinc oxide, iron oxide and silica therewith. Silicone rubber is the most stable and will remain flexible over a wide temperature range. Chlorosulfonated polyethylene rubber can be blended with other types of rubber to provide a wide range of properties.

Of the various rubber materials which can be utilized, natural rubber, cis-polyisoprene rubber, nitrile rubber, ethylene-propylene rubber, styrene-butadiene rubber, butyl rubber and neoprene rubber are generally preferred. For the primary bonding of a conduit in a well bore where the conduit will be subjected to high temperatures and pressures, fluorocarbon rubber is usually preferred.

Vulcanization of the rubber is the process that converts the rubber latex to a solid elastic and resilient state. The vulcanization process involves the crosslinking of the polymer chains and can be accomplished by incorporating one or more crosslinking agents in the rubber latex composition. The most common vulcanizing agent which can be utilized with a majority of the rubber materials described above is sulfur. Other compounds that can be used either with or without sulfur are organic peroxide compounds, azo compounds, phenolic curatives, benzoquinone derivatives, bismaleimides, selenium, tellurium, nitro compounds, resins, metal oxides, and organic sulfur compounds such as alkyl thiuram disulfides.

The rate of vulcanization increases exponentially with increases in temperature, and the time required for the vulcanization of a particular rubber latex can be varied over a wide range by the selection of a particular vulcanizing agent, vulcanizing accelerator or premature vulcanization (scorch) inhibitor or mixtures of such components. In order to initiate the vulcanization, a vulcanization activator is generally included in the rubber latex composition. Particularly suitable vulcanization activators are fatty acids such as stearic acid, metallic oxides such as zinc oxide and mixtures of such compounds.

In order to shorten the vulcanization time beyond that obtainable by the selection of vulcanizing agents alone, a vulcanization accelerator can be included in the rubber latex composition. Such accelerators generally function to initiate free radicals and they are preferably selected from the group consisting of aldehyde amine compounds, guanidine compounds, sulfenamide compounds, thiuram sulfide compounds, thiazole compounds, thiazoline compounds, dithiocarbamate compounds and mercaptoimidazoline compounds.

Fillers or extenders can be included in the vulcanizable rubber latex compositions to improve tensile strength and other properties. Examples of suitable extenders are carbon black, high styrene resins, inorganic fillers such as zinc oxide and silica and other inert fillers such as whiting, clays, synthetic fibers, ground rubber, expanded perlites, natural and synthetic microspheres, and pressurized gas. Of these, carbon black, styrene resin, zinc oxide and silica are preferred where below normal fluid densities are not a requirement.

In order to protect the vulcanized rubber compounds from degradation due to heat, light, and the effects of exposure to atmospheric air, protective agents can be included in the rubber latex compositions. Examples of such protective agents are substituted quinoline compounds, amine compounds and phenolic compounds.

An example of a vulcanizable rubber latex composition which includes natural rubber and which will vulcanize to form a solid rubber within a relatively short time period at the temperatures normally encountered in well completion operations is a pumpable aqueous dispersion comprised of 100 parts by weight natural rubber latex, 2.75 parts by weight sulfur vulcanizing agent, a vulcanization activator mixture comprised of 2 parts by weight stearic acid and 5 parts by weight zinc oxide, a vulcanization accelerator mixture comprised of 1 part by weight 2,2'-dithiobisbenzothiazole and 0.1 part by weight tetramethylthiuram disulfide, and an antioxidant comprised of a mixture of alkylated diphenyl amines.

An example of a cis-polyisoprene rubber latex composition which will vulcanize into a solid rubber mass and which is useful in well completion operations is a pumpable aqueous dispersion comprised of 100 parts by weight cis-polyisoprene latex, a vulcanizing agent comprised of 1.5 to 3 parts by weight sulfur, an activator mixture comprised of 2 to 4 parts by weight stearic acid and 3 to 5 parts by weight zinc oxide, an accelerator mixture comprised of 1 to 2 parts by weight n-cyclohexyl-benzothiazole-2-sulfenamide and 0.1 to 0.3 parts by weight tetramethylthiuram monosulfide, and an antioxidant comprised of 1 to 2 parts by weight of polybutylated bisphenol A.

An example of a nitrile rubber latex composition which will vulcanize into a solid rubber mass and which is useful in well completion operations is a pumpable aqueous dispersion comprised of 100 parts by weight nitrile rubber latex, 1.75 parts by weight of sulfur vulcanizing agent, an activator mixture comprised of 1 part by weight stearic acid and 5 parts by weight zinc oxide, an accelerator mixture comprised of 1.5 parts by weight 2,2'-dithio-bisbenzothiazole and 0.1 parts by weight tetramethylthiuram disulfide, and an antioxidant comprised of symmetrical di-beta napthyl p-phenylenediamine.

An example of an ethylene-propylene rubber latex composition which will vulcanize into a solid rubber mass and which is useful in well completion operations is a pumpable aqueous dispersion comprised of 100 parts by weight ethylenepropylene rubber latex, a vulcanizing agent mixture comprised of 6 to 8 parts by weight of a 50 percent active blend of 2,5-bis(tertbutylperoxy)-2,5-dimethylhexane in an inert mineral carrier and 0.32 parts by weight sulfur, and an activator mixture comprised of 1 to 2 parts by weight calcium stearate and 3 to 5 parts by weight zinc oxide.

An example of a styrene-butadiene rubber latex composition which will vulcanize into a solid rubber mass and which is useful in well completion operations is a pumpable aqueous dispersion comprised of 100 parts by weight styrenebutadiene rubber latex, 2 parts by weight sulfur vulcanizing agent, an activator mixture comprised of 2 parts by weight stearic acid and 5 parts by weight zinc oxide, an accelerator mixture comprised of 1.5 parts by weight 2,2'-dithiobisbenzothiazole and 0.1 part by weight of copper dimethyldithiocarbamate, and an antioxidant comprised of 1 part by weight of a mixture of alkylated diphenyl amines.

An example of a butyl rubber latex composition useful in well completion operations is a pumpable aqueous dispersion comprised of 100 parts by weight butyl rubber latex, 2 parts by weight sulfur vulcanizing agent, an activator mixture comprised of 5 parts by weight zinc oxide and 1 part by weight stearic acid and an accelerator mixture comprised of 0.5 parts by weight 2-mercaptobenzothiazole, 1 part by weight tetramethylthiuram disulfide and 1 part by weight tellurium diethyldithiocarbamate.

An example of a neoprene rubber latex composition which is useful is a pumpable aqueous dispersion comprised of 100 parts by weight neoprene rubber latex, a vulcanizing agent mixture comprised of 4 parts by weight magnesia and 5 parts by weight zinc oxide, an antioxidant comprised of 2 parts by weight of a mixture of alkylated diphenyl amines, and modifiers comprised of 0.5 parts by weight stearic acid and 0.5 parts by weight 2,2'-dithibisbenzothiazole.

The rubber latex compositions can be modified to increase or decrease their densities as required by particular applications. For example, if a heavy composition is required, density increasing additives can be included and if a lightweight composition is required, the compositions can be foamed with an inert gas such as nitrogen.

An example of a heavyweight extended rubber latex composition useful in well completion operations is a pumpable aqueous dispersion comprised of 100 parts by weight of styrene-butadiene rubber latex, 2 parts by weight sulfur vulcanizing agent, 2.5 parts by weight of a 2-mercaptobenzothiazole accelerator, an activator mixture comprised of 2 parts by weight stearic acid and 5 parts by weight zinc oxide, 0.4 part by weight of a silicone derivative defoamer, 0.1 part by weight of a hydroxyethylcellulose suspension aid, 100 parts by weight of 20/40 mesh sand, 100 parts by weight 40/60 mesh sand, 100 parts by weight silica flour and 1.0 part by weight of an antioxidant comprised of alkylated diphenyl amines.

An example of a lightweight extended rubber latex composition is a pumpable aqueous dispersion comprised of 100 parts by weight nitrile rubber latex, 1.75 parts by weight of sulfur vulcanizing agent, 1.5 parts by weight of a benzothiazyl disulfide accelerator, an activator mixture of 1 part by weight stearic acid and 5 parts by weight zinc oxide, 0.25 part by weight of hydroxyethylcellulose suspension aid, 1.5 parts by weight of an ethoxylated linear alcohol sulfonate foaming surfactant, 1 part by weight of a foam stabilizing surfactant comprised of capped polyethylene oxide and sufficient nitrogen gas to form a lightweight foam.

Test samples of one or more of the above described compositions having desired properties can be prepared and tested at the particular temperature and other conditions to be encountered in a particular well to be treated to thereby determine the time required for the composition to vulcanize into a solid rubber mass, the properties of the latex composition and vulcanized rubber formed and other variables. The quantities of the various components in the compositions can be varied to produce desired results. Once the particular vulcanizable rubber latex composition to be utilized has been selected, a well completion method using the composition is performed on the well. Generally, the rubber latex compositions can be made to vulcanize and form solid rubber masses in time periods in the range of from less than one hour to about eight hours at temperatures in the range of from about 80° F. to about 450° F.

Thus, the present invention is well adapted to carry out the objects and attain the ends and advantages mentioned as well as those which are inherent therein. While numerous changes can be made to the presently preferred embodiments of the methods and compositions of the present invention which are described herein, such changes are within the spirit of this invention as defined by the appended claims.

What is claimed is:

1. A method of forming a temporary or permanent plug or seal in a well bore or in one or more subterranean formations penetrated by the well bore comprising the steps of:
    (a) placing a vulcanizable rubber latex composition in said one or more subterranean formations or in said well bore at a desired location therein; and
    (b) allowing said rubber latex composition to vulcanize and thereby form a solid rubber plug or seal therein wherein said vulcanizable rubber latex composition is comprised of an aqueous suspension of rubber, a vulcanizing agent and a vulcanizing activator selected from the group consisting of fatty acids, metallic oxide compounds and mixtures of such compounds.

2. The method of claim 1 wherein said rubber is selected from the group consisting of natural rubber, cis-polyisoprene rubber, nitrile rubber, ethylene-propylene rubber, styrene-butadiene rubber, butyl rubber and neoprene rubber.

3. The method of claim 1 wherein said vulcanizing agent is selected from the group consisting of sulfur, organic peroxide compounds, azo compounds, phenolic curatives, benzoquinone derivatives, bismaleimides, selenium, tellurium, nitro compounds, resins, metal oxides, organic sulfur compounds and mixtures of such compounds.

4. The method of claim 1 wherein said vulcanizable rubber latex composition is further characterized to include a vulcanization accelerator selected from the group consisting of aldehyde amine compounds, guanidine compounds, sulfenamide compounds, thiuram sulfide compounds, thiazole compounds, thiazoline compounds, dithiocarbamate compounds and mercaptoimidazoline compounds.

5. The method of claim 1 wherein said vulcanizable rubber composition is further characterized to include an extender selected from the group consisting of carbon black, styrene resins, zinc oxide, silica, whiting, clays, synthetic fibers, ground rubber, expanded perlites and microspheres.

6. A method of sealing the annulus between a well bore and a conduit disposed therein comprising the steps of:

(a) pumping a vulcanizable rubber latex composition downwardly through said conduit and upwardly into said annulus; and (b) allowing said rubber composition to vulcanize and thereby form a solid rubber seal in said annulus wherein said vulcanizable rubber latex composition is comprised of an aqueous suspension of rubber, a vulcanizaing agent and a vulcanizing activator selected from the group consisting of fatty acids, metallic oxide compounds and mixtures of such compounds.

7. The method of claim 6 wherein said rubber is selected from the group consisting of natural rubber, cis-polyisoprene rubber, nitrile rubber, ethylene-propylene rubber, styrene-butadiene rubber, butyl rubber and neoprene rubber.

8. The method of claim 7 wherein said vulcanizing agent is selected from the group consisting of sulfur, organic peroxide compounds, azo compounds, phenolic curatives, benzoquinone derivatives, bismaleimides, selenium, tellurium, nitro compounds, resins, metal oxides, organic sulfur compounds and mixtures of such compounds.

9. The method of claim 8 wherein said vulcanizable rubber latex composition is further characterized to include a vulcanization accelerator selected from the group consisting of aldehyde amine compounds, guanidine compounds, sulfenamide compounds, thiuram sulfide compounds, thiazole compounds, thiazoline compounds, dithiocarbamate compounds and mercaptoimidazoline compounds.

10. The method of claim 9 wherein said vulcanizable rubber composition is further characterized to include an extender selected from the group consisting of carbon black, styrene resins, zinc oxide, silica, whiting, clays, synthetic fibers, ground rubber, expanded perlites and microspheres.

11. A method of forming a temporary or permanent seal or plug in a well bore or in one or more subterranean formations penetrated by the well bore comprising the steps of:

(a) pumping a vulcanizable rubber latex composition into said well bore or into said one or more subterranean formations to a desired location therein, said rubber latex composition being comprised of an aqueous suspension or rubber, a vulcanizaing agent and a vulcanization activator; and (b) allowing said rubber composition to vulcanize and thereby form a solid rubber plug or seal therein wherein said vulcanizaton activator is selected from the group consisting of fatty acids, metallic oxide compounds and mixtures of such compounds.

12. The method of claim 11 wherein said rubber is selected from the group consisting of natural rubber, cis-polyisoprene rubber, nitrile rubber, ethylene-propylene rubber, styrene-butadiene rubber, butyl rubber and neoprene rubber.

13. The method of claim 12 wherein said vulcanizaing agent is selected from the group consisting of sulfur, organic peroxide compounds, azo compounds, phenolic curatives, benzoquinone derivatives, bismaleimides, selenium, tellurium, nitro compounds, resins, metal oxides, organic sulfur compounds and mixtures of such compounds.

14. The method of claim 13 wherein said vulcanizable rubber latex composition is further characterized to include a vulcanization accelerator selected from the group consisting of aldehyde amine compounds, guanidine compounds, sulfenamide compounds, thiuram sulfide compounds, thiazole compounds, thiazoline compounds, dithiocarbamate compounds and mercaptoimidazoline compounds.

15. The method of claim 14 wherein said vulcanizable rubber composition is further characterized to include an extender selected from the group consisting of carbon black, styrene resins, zinc oxide, silica, whiting, clays, synthetic fibers, ground rubber, expanded perlites and microspheres.

* * * * *